Dec. 17, 1935.  C. C. FARMER ET AL  2,024,633
FLUID PRESSURE BRAKE
Filed July 7, 1932  2 Sheets-Sheet 1
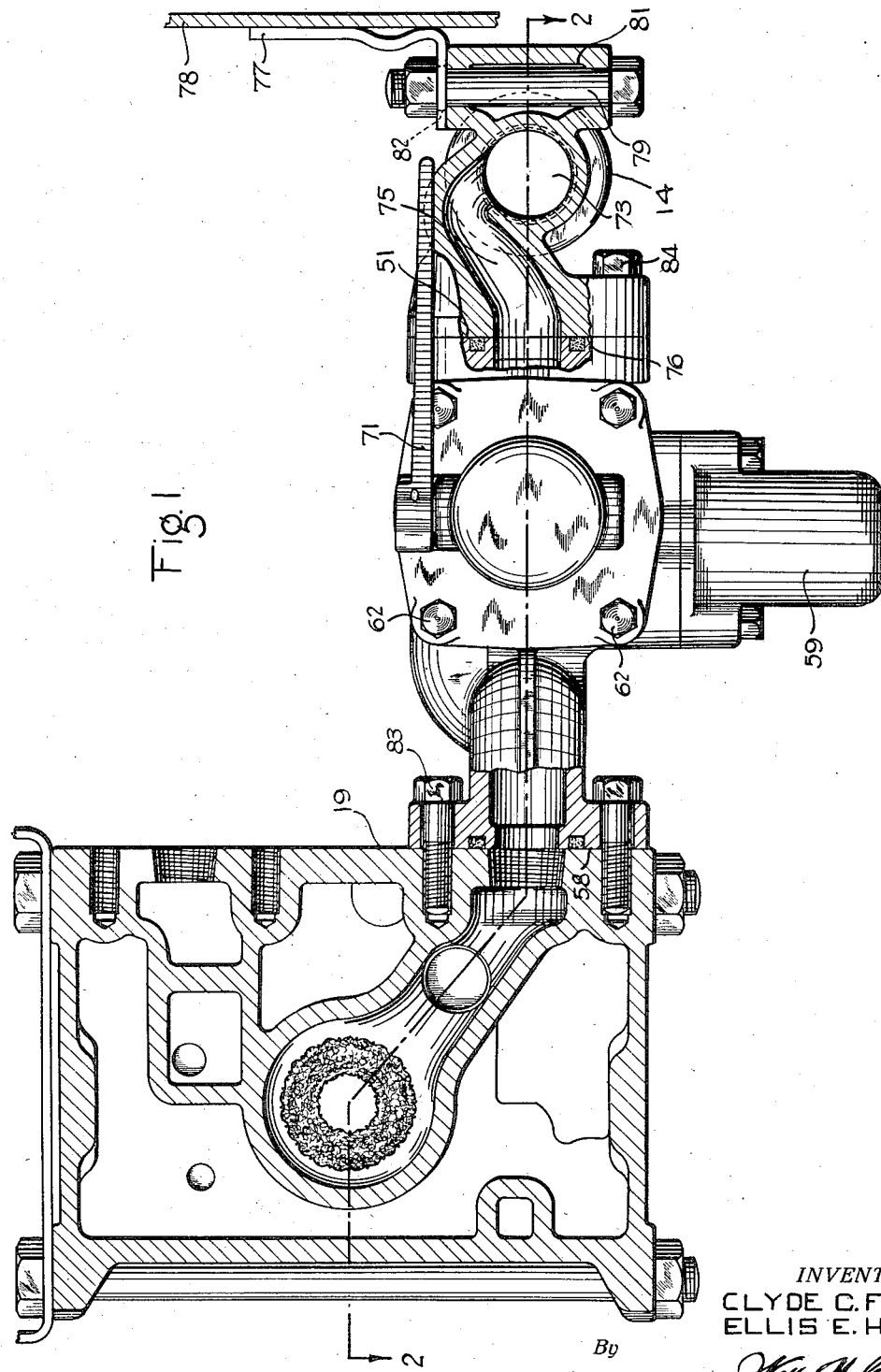
INVENTORS.
CLYDE C. FARMER
ELLIS E. HEWITT.
By
*Wm. W. Cady*
ATTORNEY.

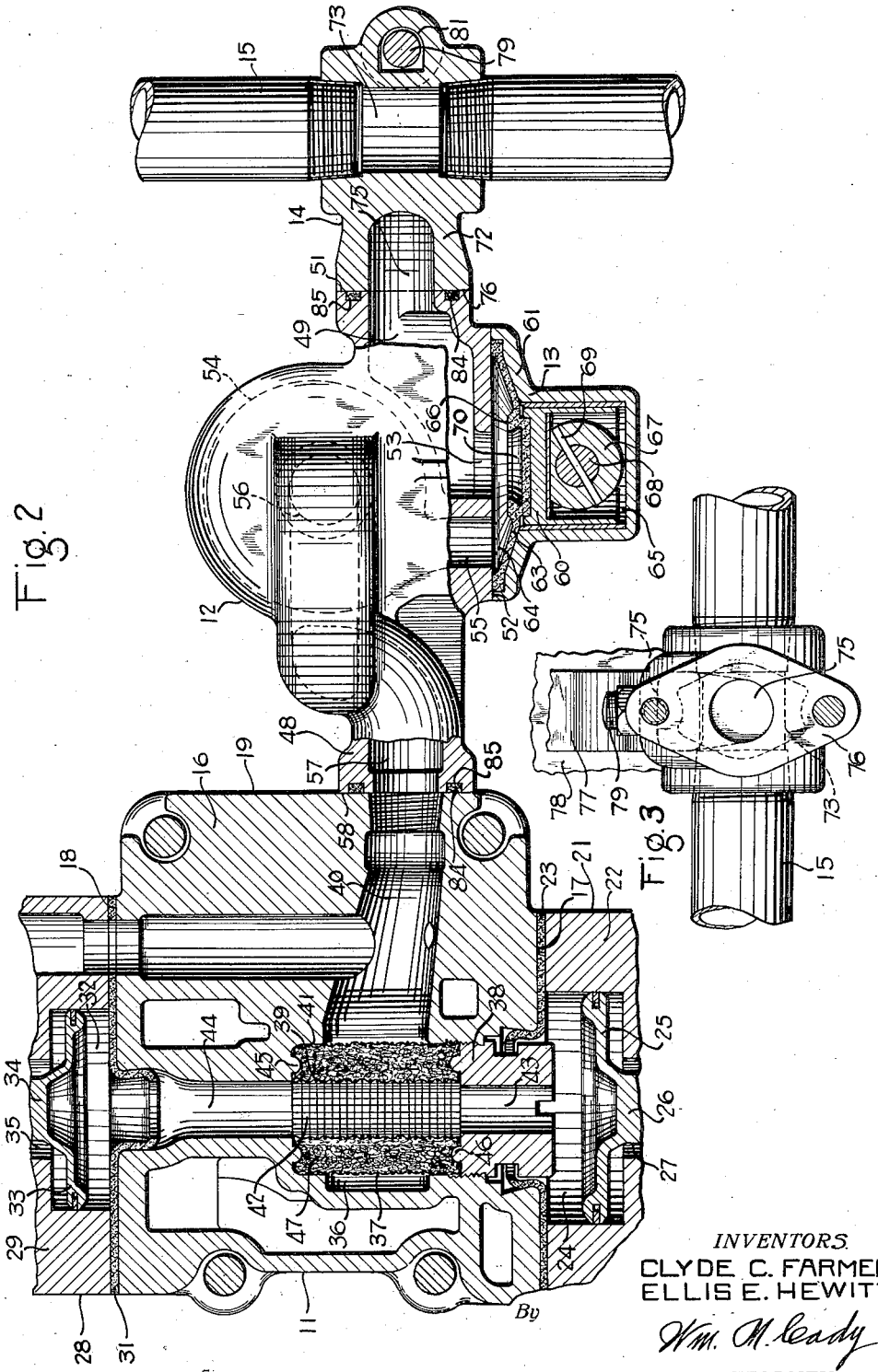

Patented Dec. 17, 1935

2,024,633

UNITED STATES PATENT OFFICE 2,024,633

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application July 7, 1932, Serial No. 621,238

7 Claims. (Cl. 303—88)

This invention relates to fluid pressure brakes, and more particularly to controlling valve devices, and the application of dirt collector and cut-out valve devices thereto and to the brake pipe.

In order to facilitate the rapid transmission of pressure variations in a brake pipe throughout the length of a train and particularly a long train, it has been found that it is very desirable to have the volume of the passageways which connect the brake pipe to the controlling valve devices as small as possible and the passageway as short and direct as possible.

Where the usual dirt collector is employed to separate dirt and moisture from fluid passing from the brake pipe to the brake controlling valve device, it has heretofore been the practice to employ pipe unions and pipe connections for connecting the dirt collector to the controlling valve device and to the brake pipe, thereby unduly increasing the length and volume of such passageways and materially increasing the volume of the entire conduit system. As a result of this practice, when the engineer's brake valve is moved to cause venting of fluid from the brake pipe at the front end thereof to effect a reduction in brake pipe pressure for the purpose of initiating an application of the brakes, the large volume of fluid initially flowing into the brake pipe from the branch passageways containing the dirt collectors, tends to retard the movement of the pressure reduction wave toward the rear end of the brake pipe, and consequently the application of the brakes on the rear cars of the train is correspondingly delayed.

An object of the invention is to provide a construction in which the dirt collector is directly connected to the controlling valve device and to the brake pipe branch pipe T without employing the usual unions and pipe connections, thereby providing a relatively short and direct passageway between the brake pipe and controlling valve device that is of substantially uniform flow area throughout and of relatively small volume.

A further object of the invention is to provide a construction having the above noted characteristics, wherein the dirt collector casing makes butt joint connections to the controlling valve device and the brake pipe branch pipe T and may readily be removed for the purpose of inspection and repair without necessitating appreciable relative displacement of the brake pipe and the controlling valve device.

A further object of the invention is to provide a construction wherein the dirt collector is rigidly and directly secured to the controlling valve device and the brake pipe branch pipe T, and wherein the branch pipe T is provided with a yielding bracket, which serves to support the brake pipe independently of the controlling valve device, thereby relieving the dirt collector of strain and facilitating ready assembly of the equipment.

A further object of the invention is to provide a construction wherein the controlling valve device comprises a pipe bracket adapted to be secured to the car or vehicle, and fluid pressure responsive valve devices carried on opposite faces of the pipe bracket, and wherein the dirt collector is directly secured to the pipe bracket at a point intermediate the valve devices so as to reduce to a minimum the length of the passageways connecting said dirt collector with said valve devices.

A further object of the invention is to provide a controlling valve device of the character above described with an improved strainer device disposed within the passageway between the dirt collector and the pressure responsive controlling valve devices, and which comprises a casing made of coarse mesh wire gauze containing fibrous material, thereby materially increasing the flow area through the strainer casing and rendering the strainer more effective by reducing the resistance to flow of fluid under pressure through the strainer casing.

These and other objects of the invention that will be made apparent throughout the further description thereof are attained by means of the fluid brake equipment hereinafter described and illustrated in the accompanying drawings; wherein Fig. 1 is a transverse sectional view partially in side elevation of a fluid brake equipment embodying features of the invention;

Fig. 2 is a transverse sectional view partially in plan elevation of the equipment shown in Fig. 2; and Fig. 3 is an elevational view of an improved branch pipe T employed in the equipment shown in Figs. 1 and 2.

Referring to the drawings, the equipment includes a brake controlling valve device 11 of the general type and character of that disclosed in the co-pending application, Serial No. 612,465, filed May 20, 1932, by Clyde C. Farmer, one of the applicants of this application, and assigned to the assignee of this application. The equipment further includes a dirt collector device 12, a cut-out valve device 13, a branch pipe T 14 and a brake pipe 15 comprising threaded sections joined by the branch pipe T 14.

The brake controlling valve device comprises, briefly, a pipe bracket 16 having three attaching faces 17, 18 and 19, the two former faces being oppositely disposed, while the face 19 is disposed intermediate said faces and in a plane normal thereto, and is adapted to be connected to the dirt collector device 12.

The controlling valve device further includes, a triple valve device 21 comprising a casing 22 which is clamped to the attaching or gasket face 17 of the pipe bracket in any desired manner with a gasket 23 interposed between the clamping face of the casing 22 and the face 17 of the pipe bracket.

A piston chamber 24 is provided in the triple valve casing and contains a piston 25 having a stem 26. The piston operates as fully described in the above noted co-pending application, to operate the main and auxiliary valves (not shown) of the triple valve device for effecting operation of the brakes in response to variations in fluid pressure within the piston chamber at predetermined rates.

The controlling valve device also includes an emergency valve device 28 comprising a casing 29 which is clamped to the attaching or gasket face 18 of the pipe bracket in any desired manner with a gasket 31 interposed between the clamping face of the casing 29 and the face 18 of the pipe bracket. A piston chamber 32 is provided in the emergency valve casing 28 and contains a piston 33 having a stem 34. The piston operates as fully described in the above noted co-pending application to operate the main and auxiliary slide valve (not shown) for effecting an emergency application of the brakes in response to a reduction in brake pipe pressure at an emergency rate.

The pipe bracket is provided with a plurality of fluid conducting passages which are open to the several attaching faces of the bracket where they are adapted to register respectively with corresponding passages formed in the casings of the triple valve device 21, emergency valve device 28, and the dirt collector device 12.

A chamber 36 is also provided in the pipe bracket which is open at one end and contains the strainer device 37, which is inserted through the open threaded end of the chamber and which is secured within the chamber by means of a screw plug 38 having a screw-threaded connection with the threaded walls of the chamber. The strainer device 37 preferably comprises a coarse mesh wire gauze tubular retainer 39 and a similar wire gauze tubular retainer 41 which surrounds the retainer 39. The inner surface of the retainer 39 defines a passage 42, which is open to the triple valve piston chamber 24 through an opening 43 in the screw plug 38 and is also open to the emergency piston chamber 32 through a passage 44 in the pipe bracket.

The inner end wall of the chamber 36 is provided with an annular rib 45 and the screw plug 38 is provided with a similar rib 46. When the strainer is clamped in place by the screw plug 38, the ribs 45 and 46 extend between the inner and outer ends respectively, of the retainers 39 and 41 and retain the retainer 39 in spaced relation to the retainer 41 and centered within the chamber 36.

The space between the retainers is packed with hair 47 or any material for separating dirt, moisture or other foreign substances from a fluid stream. In clamping the strainer device to the pipe bracket, the ribs 45 and 46 compress the hair 47 at the ends of the strainer so as to insure the close engagement of the packed hair with the ribs. It will here be understood that the ribs 45 and 46 besides serving to compress the hair packing, also serve as baffles for directing fluid which may leak past the end of the gauze retainer 41 into the packed hair, thus effectively guarding against the flow of unclean fluid to the passage 42 leading to the triple valve piston chamber 24 and to the emergency piston chamber 32.

A passage 40 leads from the chamber 36 and is open to the attaching face 19 of the pipe bracket 16, and this passage is adapted to register with a passage in the casing of the dirt collector device 12.

The dirt collector device 12 is, with certain exceptions, similar in operation to the centrifugal dirt collector device disclosed in the co-pending application, Serial No. 551,661, filed July 18, 1931, by Clyde C. Farmer, one of the applicants of this application, and assigned to the assignee of this application.

The structural features of the dirt collector device differ in many particulars from the dirt collector device disclosed in said co-pending application, in the manner of attaching the dirt collector casing to the controlling valve pipe bracket and in the provision of a cut-out valve device connected directly to the dirt collector casing.

The casing 48 is provided with a passage 49 that is open to an attaching face 51 of the casing and to another attaching face 52 of the casing through an opening 53. The casing 48 contains a frusto-conical chamber 54 that is open to the attaching face 52 through a passage 55 leading from the upper larger portion of the chamber 54 so that as fluid under pressure enters the chamber through the passage 55, it is caused to rotate in the chamber after it flows downwardly toward the mouth of the centrally disposed tubular extension 56, which constitutes a part of a passage 57, which is open to an attaching face 58 of the casing 48.

A receptacle 59 is secured to the casing opposite the mouth of the tubular extension 56 and which is open to the opening in the apex of the conical chamber 54 so that dirt and foreign particles forced to the sloping walls of the chamber 54 by the centrifugal force incident to the rotation of the fluid within the chamber, falls into the receptacle where it is retained until the receptacle is removed for cleaning.

The cut-out valve device 13 comprises a valve casing 61 that is secured to the attaching face 52 of the casing 48 by bolts 62 and contains a diaphragm type valve 63 having a chamber 64 on one side and a chamber 65 on the opposite side, the said diaphragm being provided with an undercut annular seat rib 66 that is adapted to be moved into engagement with the face 52 of the casing 48 and to close the opening 53 in the passage 49 that is open to the attaching face 51 of the casing. The diaphragm valve 63 is adapted to be clamped between the valve casing 61 and the attaching face 52 of the dirt collector casing 48.

The diaphragm valve 63 is manually operable by means of a plunger 60 slidably mounted within the chamber 65 and which engages the outer face of the diaphragm valve 63. The plunger is moved toward the diaphragm by a cam 67 fixed upon a shaft 68 by a pin 69, the shaft extending exteriorly of the valve casing 61 and being provided with a manually operable handle 71, Fig. 1.

When the shaft 68 is rotated by means of the operating handle, the plunger is forced inwardly and the seat rib 66 is positively forced into sealing engagement with the face 52 of the casing 48, thereby closing communication between the brake pipe and the dirt collector. The annular seat rib 66 of the diaphragm valve 63 being undercut, fluid pressure in the recess 70 tends to force the rib 66 against the seat face surrounding the opening 53 and assist in maintaining a tight seal. This valve is closed when it is desired to cut out the associated brake controlling valve device.

The branch pipe T 14 comprises a casing 72 having a bore 73 substantially equal in diameter to that of the brake pipe passage. The ends of the bore are threaded so as to receive the threaded end of the brake pipe sections. A passage 75 having a flow area less than that of the bore 73 leads off from the upper side of the bore in a radial direction and then turns laterally and downwardly as indicated in Fig. 1 to a point in a horizontal plane through the axis of the bore, where it is open to an attaching face 76 of the branch pipe T casing. The passage 75 is of a uniform flow area throughout its length and is of circular cross section adjacent the attaching face 76 where the passage 75 registers with the passage 49 of the dirt collector casing, but in order that the opening into the passage 75 from the bore 73 shall be near to the extreme upper part thereof, the passage is formed oblong in shape as shown in Fig. 3, with its major axis in the direction of the axis of the bore. By reason of this construction, dirt particles and liquid within the brake pipe will have less tendency to pass upwardly from the brake pipe into the passage 75 and may therefore remain in the brake pipe.

The pipe T is provided with a yielding bracket 77 that may be attached to a convenient part 78 of the car as shown in Fig. 1, the bracket being attached to the pipe T by a bolt 79 which extends through a bore 81 in the pipe T casing and a hole 82 in the bracket that is slightly larger than the diameter of the bolt and which permits of limited adjustment of the pipe T with respect to the bracket.

When the pipe bracket 16 and the pipe T 14 are secured in their respective positions on the car or vehicle, the attaching faces 19 and 76 of the respective devices are disposed in spaced, parallel and opposed relation so that the dirt collector casing may be slipped between the faces 19 and 76 by a transverse movement into the position shown in Fig. 2, and directly secured to the respective devices by means of bolts 83 and 84. In order to provide a fluid tight seal between the dirt collector casing and the respective devices, the faces 50 and 51 are provided with rubber or composition packing rings 84 disposed in annular grooves 85, which rings normally project slightly from the respective faces of the casing 48 and are adapted to be pressed into the groove under pressure when the cooperating attaching faces are drawn together. The flexibility of the bracket 77 and the adjustability of the pipe T upon the bracket permits of slight separation of the pipe T 14 and the pipe bracket 16 while the dirt collector is being inserted between them during assembly. This construction also enables removal of the dirt collector casing without disconnecting the pipe bracket or pipe T from the car. The flexible bracket 77 relieves the assembled structure from undue strains in the event of any relative deflection of the parts of the car to which the pipe bracket and pipe T are respectively secured.

In charging the equipment, assuming the diaphragm cut-out valve 66 to be open, fluid under pressure flows from the brake pipe 15 through the passage 75 in the pipe T casing, passage 49, opening 53, chamber 64, passage 55, conical chamber 54, passage 57, passage 40 in the pipe bracket, strainer chamber 36, through the strainer 37 to passage 42 and from thence through passages 43 and 44 to the piston chambers 24 and 32, respectively. It is apparent that the passageway between the brake pipe and the strainer chamber of the controlling valve device is as short and direct as it is possible to pactically make it, and is of considerable less volume than the passageways containing dirt collectors and cut-out valves usually connected by pipe unions and pipe connections, and as a consequence, the entire volume of the conduit system of the brake equipment including the brake pipe and branch passageways is materially reduced. By reason of this reduction in volume of the branch passageways of the system, less fluid under pressure is discharged into the brake pipe from the passageways while an application of the brake is being initiated, and as a result, the pressure reduction wave encounters materially less resistance and moves with greater velocity toward the rear end of the brake pipe, thereby facilitating a more rapid application of the brakes on the rear cars of the train than is possible in a system wherein the usual relatively long branch passageways of large volume are employed.

Furthermore, the system may be charged with greater rapidity due to the reduced volume thereof and the reduction of resistance incident to the short and direct branch passageways leading to the controlling valve devices.

While but one embodiment of the improved fluid brake equipment is disclosed, it is obvious that many changes may be made in the construction without departing from the spirit of the invention.

Having now described our invention, what we claim as new and desire to secure by Letters Patent, is:

1. In a fluid pressure vehicle brake equipment, the combination with a brake controlling valve device having a casing provided with a flat connection face, and a brake pipe having a branch pipe T provided with a flat connection face, means for supporting the branch pipe T on the vehicle in spaced relation to said controlling valve device casing with its connection face facing the connection face of said casing, of a dirt collector having a rigid casing provided with two relatively fixed flat connection faces connected by a passage through which fluid under pressure may flow from the valve device to said pipe T, the connection faces of said dirt collector casing being adapted to engage and connect respectively with the connection faces of said valve device casing and said pipe T and means for rigidly joining said dirt collector casing to said valve device casing and said pipe T.

2. In a fluid pressure vehicle brake equipment, the combination with a brake controlling valve device having a casing attached to the vehicle and provided with a flat connection face, and a brake pipe having a branch pipe T provided with a flat connection face and attached to the vehicle in spaced relation to said casing with its connection face facing the connection face of said casing, of a dirt collector having a rigid casing provided with two flat oppositely disposed relatively fixed connection faces connected by a passage through which fluid under pressure may flow from the valve device to said pipe T, the dirt collector casing being adapted to fit between the connection faces of the controlling valve device and said pipe T so that the connection faces of the dirt collector casing cooperatively engage the respective faces of said valve device casing and said pipe T, and means for rigidly joining said dirt collector casing to said valve casing and said pipe T.

3. In a fluid pressure vehicle brake equipment, the combination with a brake controlling valve device having a casing attached to the vehicle and provided with a flat connection face, and a brake pipe having a branch pipe T provided with a flat connection face and attached to the vehicle in spaced relation to said casing with its connection face facing the connection face of said casing, of a dirt collector having a rigid casing provided with two flat oppositely disposed relatively fixed connection faces connected by a passage through which fluid under pressure may flow from the valve device to said pipe T, the dirt collector casing being adapted to be fitted between the connection faces of said valve device and said pipe T by a lateral movement of the dirt collector casing with respect to said valve device casing in a direction of the plane of the connection face thereof so that the connection faces of the dirt collector casing cooperatively engage the respective faces of said valve device casing and said pipe T, and means for rigidly joining said dirt collector casing to said valve casing and said pipe T so as to provide a fluid tight joint between said dirt collector casing and said valve device casing and said pipe T respectively.

4. A branch pipe T for fluid brake equipment comprising a casing having a threaded bore for receiving the threaded ends of two pipe sections and having a branch passage leading from the bore radially upwardly from a point between the ends of said bore and then laterally and opening out of an attaching portion of the casing that is adapted to be connected to a conduit, the said passage adjacent the bore being oblong with its major axis parallel to the axis of the bore and the mouth of said passage adjacent the attaching portion being substantially circular and the contour of the walls of said passage between the ends thereof being such that a substantially uniform cross sectional area is maintained throughout the length of the passage.

5. A branch pipe T for fluid brake equipment comprising a casing having a threaded bore for receiving the threaded ends of two pipe sections and having a branch passage leading from the bore radially upwardly from a point between the ends of said bore and then laterally and opening out of an attaching portion of the casing that is adapted to be connected to a conduit, the said passage adjacent the bore being oblong with its major axis parallel to the axis of the bore and the mouth of said passage adjacent the attaching portion being substantially circular and the contour of the walls of said passage between the ends thereof being such that a substantially uniform cross sectional area less than that of said bore is maintained throughout the length of the passage.

6. In a fluid pressure brake equipment, the combination with a brake controlling valve device having a casing, and a brake pipe having a branch pipe T, of a rigid casing member provided with a passage through which fluid under pressure may flow between the said valve device and the said brake pipe, and embodying a dirt separating and collecting device, the said rigid casing member being adapted to butt against and to be rigidly secured to said valve device casing and said branch pipe T, thereby constituting the sole means of fluid connection between said valve device and said brake pipe.

7. In a fluid pressure brake, the combination with a brake controlling valve device having a casing, and a brake pipe having a branch pipe T, of a rigid casing member constituting the sole means of fluid connection between said valve device and said brake pipe, said rigid casing member being interposed between and engaging said brake controlling valve device casing and said pipe T, and adapted to be rigidly secured thereto, said sectional casing member comprising a main portion having a passage through which fluid may flow between the brake controlling valve device and said pipe T, said passage including a chamber for imparting circular motion to the fluid flowing through the passage, a portion separable from said main portion and containing a chamber for collecting foreign particles separated from the fluid flowing through the chamber of said main portion, and another portion separable from said main portion and containing a valve device for controlling the flow of fluid through the passage in said main portion.

CLYDE C. FARMER.
ELLIS E. HEWITT.